United States Patent [19]

Furukawa

[11] Patent Number: 4,566,547
[45] Date of Patent: Jan. 28, 1986

[54] REMAINING AMOUNT INDICATOR

[75] Inventor: Hideaki Furukawa, Yokohama, Japan

[73] Assignee: Canon Kabushiki Kaisha, Tokyo, Japan

[21] Appl. No.: 591,885

[22] Filed: Mar. 21, 1984

Related U.S. Application Data

[63] Continuation of Ser. No. 363,517, Mar. 30, 1982, abandoned.

[30] Foreign Application Priority Data

Apr. 10, 1981 [JP]  Japan .................................. 56-52911

[51] Int. Cl.$^4$ ..................... G01G 23/18; G01G 19/52; G01G 23/30; G03G 15/00
[52] U.S. Cl. ...................................... 177/46; 177/132; 177/177; 177/262; 355/14 SH
[58] Field of Search ................... 177/46, 177, 245, 45, 177/132, 144, 262; 355/14 SH

[56] References Cited

U.S. PATENT DOCUMENTS 3,930,258  12/1975  Dick et al. ...................... 346/140 IJ Primary Examiner—George H. Miller, Jr.
Attorney, Agent, or Firm—Fitzpatrick, Cella, Harper & Scinto

[57] ABSTRACT

A remaining amount indicator for indicating remaining amount of consuming material such as papers, toner, web or silicone oil in a recording apparatus such as a copying machine or a laser beam printer is disclosed. The remaining amount detected by a detector is displayed by a display in a first display mode until the remaining amount reaches a predetermined level, and in a second display mode after the remaining amount has reached the predetermined level. Further, the quantity of the display is reduced as the remaining amount decreases.

12 Claims, 9 Drawing Figures

REMAINING AMOUNT INDICATOR

This application is a continuation of application Ser. No. 363,517, filed Mar. 30, 1982 now abandoned.

BACKGROUND OF THE INVENTION

1. Field of the Invention

The present invention relates to a remaining amount indicator for indicating amount of remaining consumable material for example, papers, toner, webs or silicone oil in a recording machine such as a copying machine, a laser beam printer, or the like.

2. Description of the Prior Art

In a copying machine, a paper cassette is incorporated in the copying machine in order to save a space. In such a case, since the amount of remaining papers in the cassette cannot be checked by direct visual observation, a binary indication is given when the amount of the remaining papers is less than a predetermined amount, or the amount of remaining papers is indicated stepwise. However, it is difficult to determine an exact amount of remaining papers by such remainder indication, and a warning signal indicating a small amount of remaining papers or an alarm signal indicating the emptiness of the paper cassette are confusing with other indications and may be misleading.

SUMMARY OF THE INVENTION

It is an object of the present invention to provide a remaining amount indicator which is compact and highly visible.

It is another object of the present invention to provide a remaining amount indicator which detects the amount of remaining consumable material and gives an indication in a first display mode until the amount of remainder reaches a predetermined amount and gives an indication in a second display mode after the amount of remainder has reached the predetermined amount.

It is a further object of the present invention to provide a remaining amount indicator which gives a variable indication depending on the amount of remaining consumable material.

Those and other objects of the present invention will be apparent from the following description of the present invention.

DETAILED DESCRIPTION OF THE PREFERRED EMBODIMENTS

Figure 1:
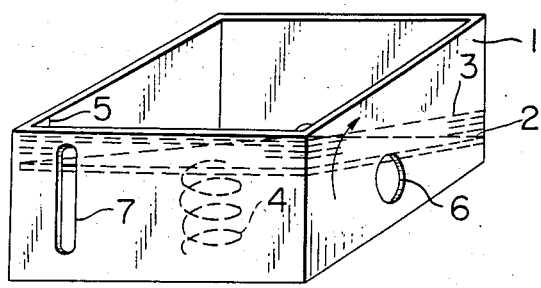
FIG. 1 shows a perspective view of a structure of a paper cassette.

FIG. 1 shows an example of a paper cassette used in the present invention. Copying papers are accommodated in a stack 3 on a movable bottom plate 2 of the paper cassette 1. The paper stack 3 accommodated on the movable bottom plate 2 is always biased by a spring 4 toward a paper stopper 5 formed on the top of the paper cassette 1. Light from a light source 9 (FIG. 2) arranged in a copying machine is guided into the cassette 1 through a projecting hole 6. Numeral 7 denotes an amount of remainder detecting hole. A portion of light emitted into the cassette 1 from the projecting hole 6 is taken out of the cassette 1 through the hole 7 and guided to a photo-detector 10 arranged in the copying machine.

Figure 2:
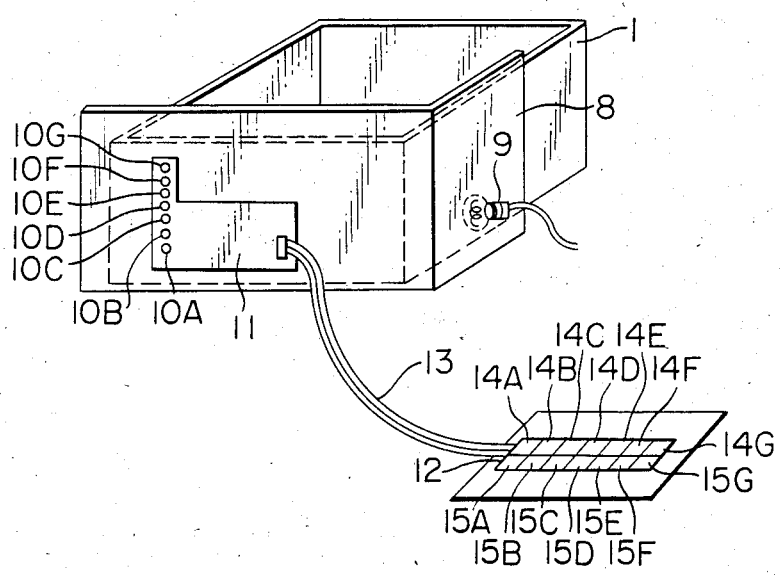
FIG. 2 shows a perspective view of the paper cassette shown in FIG. 1, loaded in a case having a remaining amount indicator of the present invention.

FIG. 2 shows the paper cassette 1 loaded in a cassette case 8 of the copying machine. A light emitting lamp 9 is mounted on a side wall of the cassette case 8 at the position opposing the projecting hole 6 of the paper cassette 1. A printed circuit board 11 is mounted on the opposite side wall of the cassette case 8 and a display control circuit (FIG. 3) to be described later is mounted on the printed circuit board 11 and photo-transistors (seven photo-transistors 10A–10G in the present embodiment) serving as a photo-detector 10 are arranged on the printed circuit board 11 in a vertical line opposing to the amount of remainder detecting hole 7 of the paper cassette 1. Numeral 12 denotes a remaining amount display arranged on a console of the copying machine. The display 12 and a connector of the printed circuit board 11 are interconnected via a cable 13.

With the paper cassette 1 loaded in the cassette case 8 of the copying machine, as the papers in the cassette 1 are consumed, the movable bottom plate 2 rises in the arrow direction. Thus, as the movable bottom plate 2 rises, the photo-transistors 10 arranged in the vertical line to oppose the detecting hole 7 are sequentially exposed to the light emitted from the lamp 9 starting from the bottommost photo-transistor 10A on the cassette 1. A detected output is supplied to the remaining amount display 12 through the control circuit on the printed circuit board 11 to display the presence or absence of the remaining papers and the amount of the remaining papers, as will be explained later.

Figure 3:
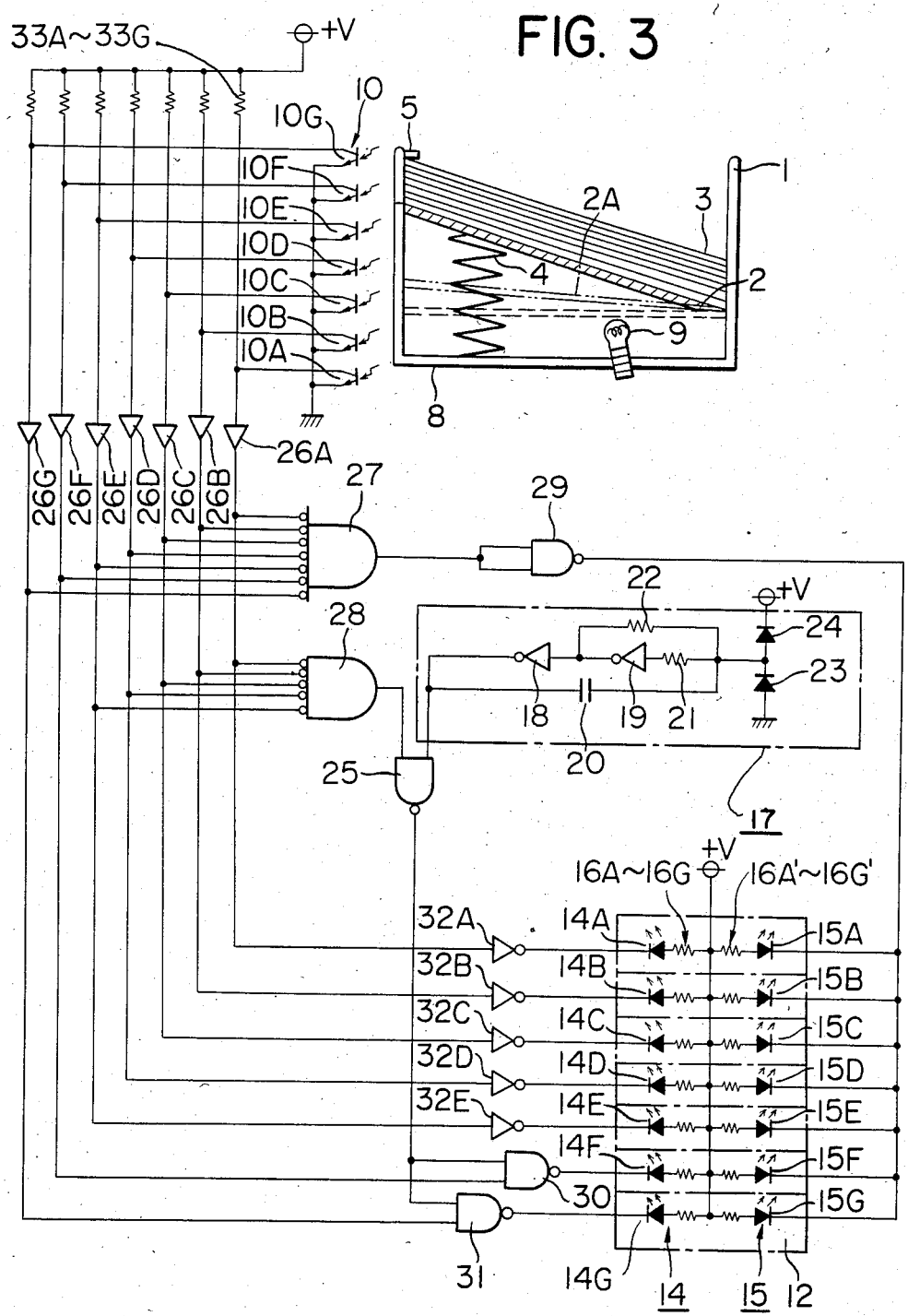
FIG. 3 shows a circuit diagram for indicating the amount of remainder in the paper cassette in accordance with the present invention.

FIG. 3 shows an embodiment of the display control circuit and the display in the amount of remainder display device of the present invention. Referring to FIG. 3, numerals 14A–14G denote seven green light emitting elements and numerals 15A–15G denote seven red light emitting elements. Those light emitting diodes 14A–14G and 15A–15G are connected to a power supply +V through resistors 16A–16G and 16A'–16G', respectively, to form the display 12. The green light emitting elements 14A–14G are arranged to be paired with and opposed to the photo-transistors 10A–10G, respectively, so that they are activated by the corresponding photo-transistors 10A–10G when a sufficient amount of papers remain, that is, when the amount of the remaining papers is so large that the photo-transistor 10E cannot receive the light from the lamp 9 in FIG. 3, to indicate the amount of remainder. Numeral 17 denotes a flash indication oscillator which comprises inverters 18 and 19, a capacitor 20, resistors 21 and 22 and protecting diodes 23 and 24 for the inverter 19. The output signal from the flash indication oscillator 17 is supplied to one input terminal of a NAND gate 25.

On the other hand, the outputs from the photo-transistors 10A–10G are supplied to a NOR gate 27 which serves as zero remaining amount detecting means through buffers 26A–26G. The outputs of the buffers 26A–26E are also supplied to a NOR gate 28 which serves as small remaining amount detecting means. The output of the NOR gate 27 is supplied to the red light emitting elements 15A–15G through an inverter 29 which is a NAND gate to indicate the zero remaining amount. The output of the NOR gate 28 which indicates the small remaining amount is supplied to the other input terminal of the NAND gate 25. The output of the NAND gate 25 which is the small remaining amount flashing output is supplied to one input terminal of each of NAND gates 30 and 31, and outputs of buffers 26F and 26G are supplied to the other input terminals of the NAND gates 30 and 31, respectively, to give the small remaining amount flashing indications. The outputs of the buffers 26A-26E are supplied to the green light emitting elements 14A-14E through inverters 32A-32E. The NAND gates 25 and 29-31 and the inverters 32A-32E form remaining amount display control means. The collectors of the photo-transistors 10A-10G are connected to the power supply +V through resistors 33A-33E, respectively, and the emitters thereof are grounded.

Let us assume that the bottom plate 2 of the paper cassette 1 is at a position shown by a double dot-chain line 2A in FIG. 3. Since the papers are stacked above the bottom plate 2A, the photo-transistors 10B-10G cannot receive the light from the lamp 9 and only the photo-transistor 10A receives the light and conducts. As a result, the output of the buffer 26A is "0" and the output of the inverter 32A is "1" so that the green light emitting element 14A stops emitting the green light. The remaining photo-transistors 10B-10G do not conduct because the light thereto is blocked, and the outputs of the buffers 26B-26G are "1", which are applied to the input terminals of the inverters 32B-32E and the NAND gates 30 and 31. As a result, the inverters 32B-32E supply "0" signals to the green light emitting elements 14B-4E so that the elements 14B-14E emit the green lights. Since the output of the NOR gate 28 is "0" (turn-off signal) at this time, the NAND gate 25 supplies "1" signal to the NAND gates 30 and 31, which in turn supply "0" signals to the green light emitting elements 14F and 14G, respectively. Thus, the elements 14F and 14G emit the green lights to indicate the remaining amount by the number of turn-on elements. Since the NOR gate 27 also supplies the "0" signal to the NAND gate (inverter) 29, the NAND gate 29 supplies the "1" signal to the red light emitting elements 15A-15G to turn off the red light emitting elements 15A-15G.

Accordingly, when the amount of remaining papers is such that the bottom plate 2 is at the position 2A in the cassette 1, only one of the seven green light emitting elements is turned off and the other green light emitting elements 14B-14G are turned on and all of the red light emitting elements 15A-15G are turned off so that the amount of remaining papers is indicated by the number of turned on green light emitting diodes. As the papers are consumed, the bottom plate 2 rises so that the green light emitting elements 14B-14D are sequentially turned off to indicate the amount of the remaining papers.

As the papers in the stack 3 are further consumed and the amount of the remaining papers reaches such a level that the five photo-transistors 10A-10E receive the light from the lamp 9 and conduct, "0" signals are applied to all of the input terminals of the NOR gate 28, which in turn supplies a "1" signal to the NAND gate 25 as a turn-on grant signal. Since the flashing signal is applied to the NAND gate 25 from the flashing oscillator 17, the NAND gate 25 produces an inverted flashing signal while the turn-on grant signal "1" is applied thereto from the NOR gate 28, and produces the "1" signal while the turn-off signal "0" is applied thereto from the NOR gate 28. Since the "1" outputs from the buffers 26F and 26G are supplied to the NAND gates 30 and 31, respectively, when the turn-on grant signal is "1", the green light emitting elements 14F and 14G flash to indicate the small remaining amount as the inverted flashing signal is supplied from the NAND gate 25 to the NAND gates 30 and 31. The other green light emitting diodes 14A-14E are turned off at this time so that the small remaining amount of the papers is indicated by the flash of the two light emitting elements 14F and 14G. The red light emitting elements 15A-15G are all turned off at this time.

As the papers are further consumed and the photo-transistors 10A-10F conduct, the "0" output from the photo-transistor 10F is supplied to the NAND gate 30 so that the green light emitting diode 14F is turned off and only the light emitting element 14G flashes by the output of the NAND gate 25 to indicate the small remaining amount of the papers.

Finally, as the paper cassette 1 approaches an empty state, all of the seven photo-transistors 10A-10G conduct. As a result, all of the green light emitting elements 14A-14G are turned off and the "0" outputs are supplied to all input terminals of the NOR gate 27, which in turn supplies the "1" output to the inverter 29, which in turn supplies the "0" output to the red light emitting elements 15A-15G to simultaneously turn on the elements 15A-15G. In this manner, the zero remaining amount indication is given to indicate the amount of the remaining paper is zero.

As seen from the above description, in the present embodiment, all of the green light emitting elements 14A-14G are turned on when the paper cassette 1 is filled with the papers, and as the papers in the stack 3 are consumed the green light emitting elements 14A, 14B, . . . are sequentially turned off to indicate the remaining amount, and as the papers are further consumed the light emitting elements 14F and 14G flash to give small remaining amount indication, and as the papers are further consumed the light emitting element 14F is turned off and only the light emitting element 14G continues to flash to indicate further decrease of the remaining amount. When the paper cassette 1 approaches the empty state and all of the green light emitting elements 14A-14G are turned off, the red light emitting elements 15A-15G are simultaneously turned on to give the alarm for the zero remaining amount.

Figure 4:
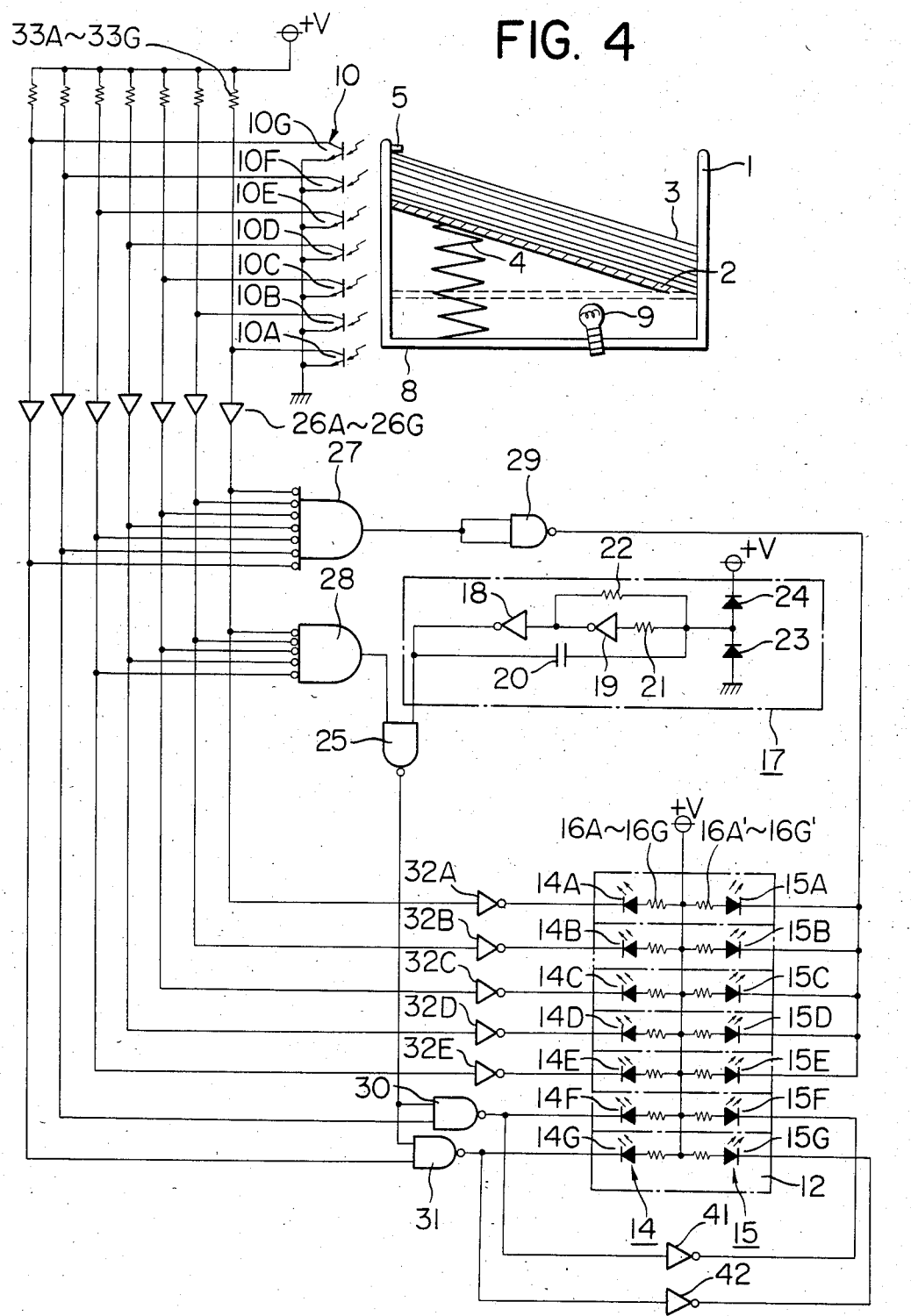
FIGS. 4 and 5 show circuit diagrams in accordance with other embodiments of the present invention.

FIG. 4 shows another embodiment of the present invention. In the present embodiment, the red light emitting elements 15G and 15F are not connected to the inverter 29 but the outputs of the NAND gates 30 and 31 are supplied to the red light emitting elements 15F and 15G through inverters 41 and 42, respectively. As a result, as the amount of the remaining papers in the stack 3 reduces and the photo-transistors 10A-10E conduct, the green light emitting elements 14F and 14G flash as in the embodiment of FIG. 3 and the red light emitting elements 15F and 15G flash in the opposite phase to the green light emitting elements 14F and 14G, that is, the light emitting elements 14F and 14G and the light emitting elements 15F and 15G alternately flash in green and red. At this time, the green light emitting elements 14A-14E and the red light emitting elements 15A-15E are turned off. As a result, in the present embodiment, the warning indication for the samll remaining amount is more clearly given. As the papers are further consumed and the photo-transistors 10A-10F conduct, only the green light emitting element 14G and the red light emitting element 15G alternately flash repeatedly. Since the "0" output of the inverter 41 is supplied to the red light emitting element 15F, it continues to emit the red light. At this time, the green light emitting elements 14A-14F and the red light emitting elements 15A-15E are turned off. As the paper cassette 1 approaches the empty state and all of the photo-transistors 10A-10G conduct, all of the green light emitting elements 14A-14G are turned off and all of the red light emitting elements 15A-15G are turned on to indicate the zero remaining amount, as in the case of the embodiment of FIG. 3.

Figure 5:
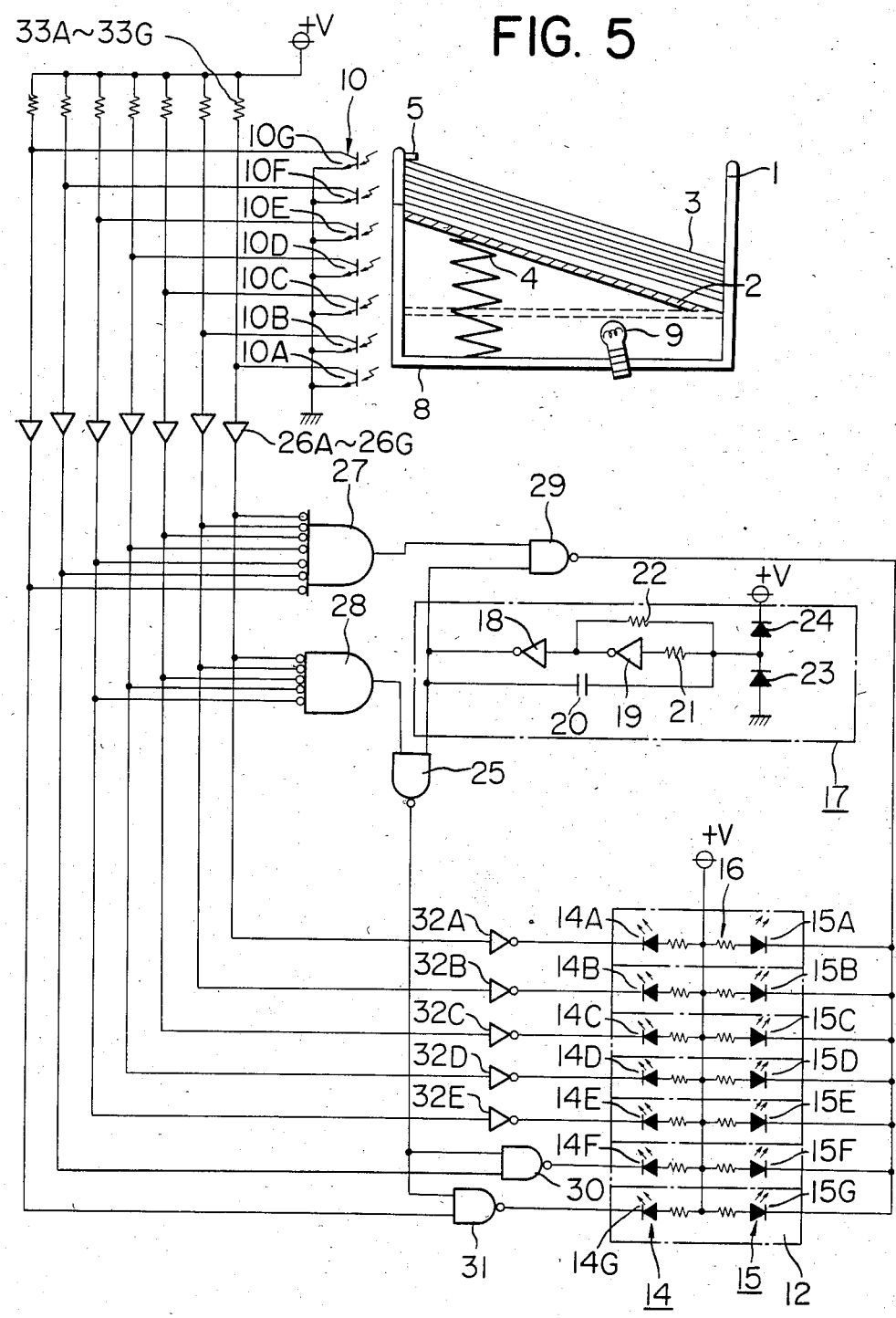

FIG. 5 shows a further embodiment of the present invention. In the present embodiment, the output of the NOR gate 27 is supplied to one input terminal of the NAND gate 29 and the flashing signal from the flashing oscillator 17 is supplied to the other input terminal of the NAND gate 29. The other construction is identical to that of the embodiment of FIG. 3. The indication given in the present embodiment is identical to that of the embodiment of FIG. 3 except when the paper cassette 1 approaches the empty state and all of the photo-transistors 10A-10G conduct. When all of the photo-transistors 10A-10G conduct, the NOR gate 27 supplies the "1" output to the NAND gate 29, which in turn supplies the inverted flashing signal so that the red light emitting elements 15A-15G are simultaneously flashed to give the alarm indication for the zero remaining amount.

Figure 6:
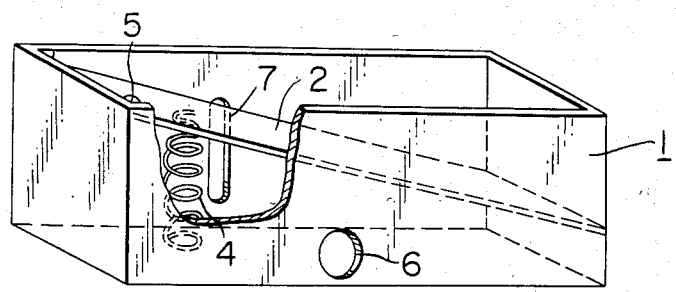
FIGS. 6-9 show perspective views of other embodiments of the paper cassette.
Figure 7:
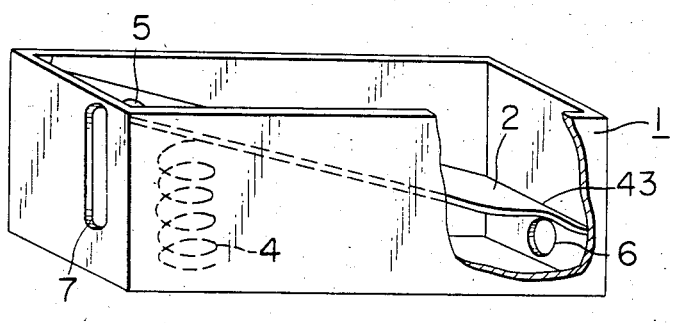
Figure 8:
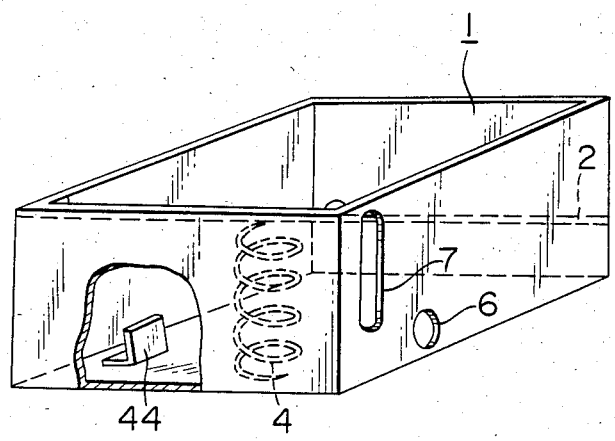
Figure 9:
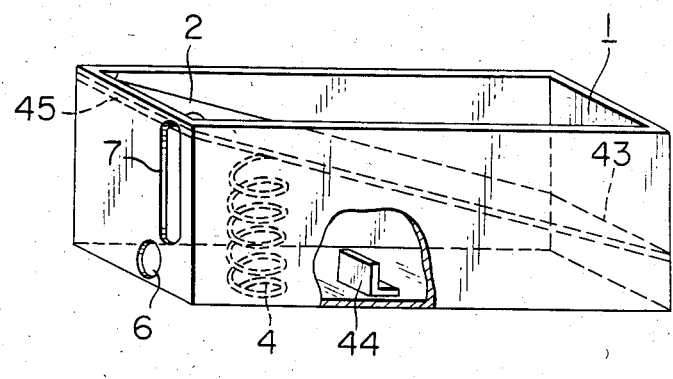

FIGS. 6, 7, 8 and 9 show various examples of the paper cassette 1 used in the present invention. In FIG. 6, the remaining amount detecting hole 7 and the projecting hole 6 are provided on opposite sides of the paper cassette 1. In FIG. 7, the projecting hole 6 is arranged at a bottom of a side wall under a hinge 43 attached to the movable bottom plate 2. In FIGS. 8 and 9, the remaining amount detecting holes 7 and the projecting holes 6 are arranged on the same wall of the paper cassette 1. In FIG. 8, the remaining amount detecting hole 7 and the projecting hole 6 are formed in the same side wall of the paper cassette 1 and a reflecting mirror 44 is arranged in the paper cassette 1 at such a position that the light of the lamp 9 projected through the projecting hole 6 is reflected by the reflecting mirror 44 and directed to the photo-transistors 10A-10G through the detecting hole 7. In FIG. 9, the remaining amount detecting hole 7 and the projecting hole 6 are formed in the side wall of the paper cassette 1 which faces a free end 45 of the bottom plate 2 and the reflecting mirror 44 is arranged in the paper cassette 1 at such a position that the light of the lamp 9 is reflected by the reflecting mirror 44 and directed to the photo-transistors 10A-10G. Any appropriate paper cassette 1 may be selected depending on the structure of the copying machine in which the paper cassette 1 is incorporated.

While the photo-transistors are used to detect the remaining amount in the above embodiments, other photo-electric conversion elements such as photo-diodes or CdS elements may be used instead of the photo-transistors. When the light source is incorporated in a reflection type sensor and placed at the photo-transistors, the projecting hole is not necessary. The display may be constructed by liquid crystal devices or small lamps instead of the light emitting diodes, or other display devices such as electrochromic display or plasma display may be used.

Alternatively, a pressure sensitive element which changes its resistance by a pressure may be used to detect the weight of the consuming material to detect the remaining amount thereof.

Where a plurality of paper cassettes are incorporated in the copying machine, a set of light source and remaining amount detecting photo-transistors are provided for each paper cassette and the remaining amount detecting outputs from the photo-transistors for the respective paper cassettes are selectively supplied by a switch to the display control circuit, that is, the buffers 26A-26G of FIG. 3. In this manner, one display control circuit can be shared by the plurality of paper cassettes.

While the present invention has been described in the environment of the indication of the amount of the remaining papers in the copying machine, the present invention is not limited to such an application but it may be widely applicable to indicate the remaining amount of toner, a cleaning web for a transfer drum or silicone oil.

As described hereinabove, according to the present invention, since the display mode is changed depending on the remaining amount of the consumable material, the warning indication or the alarm indication can be given in a readily distinguishable manner so that the amount of remainder can be monitored in an unconfusing manner.

What I claim is:

1. A remaining amount indicator comprising:
   detecting means for detecting a remaining amount of recording paper by sensing a position of a loading member on which the recording paper is loaded, wherein said position varies in accordance with the amount of recording paper on said loading member;
   display means for displaying the remaining amount of recording paper; and
   control means for controlling said display means in accordance with the output of said detecting means so that said display means performs a progressive display of the remaining amount of recording paper on said loading member.

2. An indicator according to claim 1, wherein said display means includes a plurality of display elements, and said control means controls said display means to selectively turn on said plurality of display elements in accordance with the remaining amount of recording paper detected by said detecting means.

3. An indicator according to claim 1, wherein said control means causes said display means to operate in plural display modes in accordance with the output of said detecting means.

4. An indicator according to claim 3, wherein said plural display modes include a first display mode wherein the display amount of said display means is decreased in accordance with decrease of the remaining amount of recording paper until it reaches a first predetermined amount.

5. An indicator according to claim 4, wherein said plural display modes include a second display mode wherein said display means provides on and off display after the remaining amount of recording paper reaches the first predetermined amount until it reaches a second predetermined amount.

6. An indicator according to claim 4 or 5, wherein said first predetermined amount represents that the remaining amount of recording paper is small.

7. An indicator according to claim 5, wherein said display means performs display with the same display color in both the first and second display modes.

8. An indicator according to claim 5, wherein said plural display modes include a third display mode in which said display means performs display with a color different from that in the first or second display mode after the remaining amount of recording paper reaches the second predetermined amount.

9. An indicator according to claim 5 or 8, wherein said second predetermined amount represents that the remaining amount of recording paper is zero.

10. An indicator according to claim 8, wherein said display means performs on and off display in the third display mode.

11. An indicator according to claim 5, wherein said display means performs on and off display with a plurality of display colors in the second display mode.

12. An indicator according to claim 5 or 11, wherein said display means reduces the display amount in accordance with the remaining amount of recording paper in the second display mode.

* * * * *